UNITED STATES PATENT OFFICE.

FRIEDRICH ALEXANDER RITSCHKE, OF GEESTHACHT-ON-THE-ELBE, GERMANY, ASSIGNOR TO E. I. DU PONT DE NEMOURS POWDER COMPANY, OF WILMINGTON, DELAWARE, A CORPORATION OF NEW JERSEY.

PROCESS OF MANUFACTURE OF SMOKELESS GUNPOWDER.

1,009,577.
No Drawing.

Specification of Letters Patent. Patented Nov. 21, 1911.
Application filed May 18, 1911. Serial No. 627,906.

*To all whom it may concern:*

Be it known that I, FRIEDRICH ALEXANDER RITSCHKE, subject of the German Emperor, residing at Bergedorferstrasse 3, Geesthacht-on-the-Elbe, Germany, have invented a new and useful Improvement in Processes of the Manufacture of Smokeless Gunpowder, of which the following is a full, clear, and exact description.

I have discovered that it is possible to gelatinize nitro cellulose of any desired nitrogen content and to make gelatin, containing less than thirty per cent. (30%) of nitro glycerin, without the addition of a solvent, volatile or non-volatile, and to prepare, from the gelatin thus produced, powder in the shape of tubes.

My method is as follows: I mix nitro cellulose and nitro glycerin, in proportions of less than thirty per cent. (30%) of nitro glycerin. This mixture is passed through rolls which are heated to a temperature of substantially ninety (90) degrees centigrade. From this I form tubular powder at an average pressure of not less than two hundred (200) atmospheres.

As an example 75 parts by weight of nitro cellulose are mixed with 25 parts by weight of nitro glycerin. This mixture is passed through rolls which are heated to a temperature of substantially ninety (90) degrees centigrade. After this treatment the material is formed in cylindrical presses at an average pressure of 200 atmospheres, the temperature of substantially 90° C. being maintained during the treatment in tubes.

Having now fully described my invention, what I claim and desire to protect by Letters Patent is:

The process of making an explosive substance of nitro-cellulose and less than 30% of nitro glycerin without employing other gelatinizing agents or solvents consisting in heating the substance to a temperature of about 90° centigrade and shaping it under a pressure of at least 200 atmospheres.

In testimony of which invention, I have hereunto set my hand, at Hamburg, on this 28th day of April, 1911.

FRIEDRICH ALEXANDER RITSCHKE.

Witnesses:
 ERNEST H. L. MUMMENHOFF,
 IDA CHRIST. HAFERMANN.